United States Patent [19]
Leduchowski

[11] Patent Number: 5,551,660
[45] Date of Patent: Sep. 3, 1996

US005551660A

[54] DRUM STICK HOLDER

[76] Inventor: Kenneth L. Leduchowski, 17676 Cameron St. Apt. 1, Huntington Beach, Calif. 92647

[21] Appl. No.: 216,803

[22] Filed: Mar. 24, 1994

[51] Int. Cl.$^6$ ............................................. E04G 3/00
[52] U.S. Cl. ................................. 248/276.1; 248/284.1; 248/541; 248/534; 84/453
[58] Field of Search .......................... 248/276, 284, 248/311.2, 314, 230, 535, 541, 534, 104, 184, 276.1, 284.1, 230.1, 230.2, 184.1; 84/453, 421, 422.4

[56] References Cited

U.S. PATENT DOCUMENTS

| | | | |
|---|---|---|---|
| 3,304,035 | 2/1967 | Davis | 248/40 |
| 4,402,481 | 9/1983 | Sasaki | 248/276 |
| 4,453,695 | 6/1984 | Sennot | 248/660 |
| 4,531,443 | 7/1985 | Gillis | 84/329 |
| 4,747,569 | 5/1988 | Hoshino | 84/421 |
| 4,887,784 | 12/1989 | Kayali | 248/311.2 |
| 4,964,603 | 10/1990 | Yair | 248/230 |
| 5,092,552 | 3/1992 | Dayton | 248/280.1 |

OTHER PUBLICATIONS

Multi Clamp.

*Primary Examiner*—Karen J. Chotkowski
*Assistant Examiner*—Anita M. King

[57] ABSTRACT

An improved Drum Stick Holder is particularly useful for assisting musicians in locating and recovering musical accessories. The clamp 8 comprises an opening 10, two semi-circular arms 12, two straight parallel arms 40, and a shaft 38 which ends in a coupling 50. This adjustable fastener makes for easy removal and effective fastening of apparatus to a stand, bar, or rim. The matching coupling 20 allows for clockwise or counterclockwise adjustments by means of a screw 48 and a spring 54 wing nut. A column 56, which is attached by a coupling 20 at one end and a coupling 58 at the other end of a column 56, is joined to a coupling 24. Coupling 58/24 allows for forwards and backwards rotational adjustments by means of screw, spring, wing nut 60/64/22. Coupling 24 is attached to extension arm 28 which ends in a cross bar 36. Two cylinders 30/34 are attached by wing nuts 32/72 through cross bar 36 and have a spacer 80/78 between cylinders 30/34 and cross bar 36 that enables independent rotational adjustments of each cylinder.

12 Claims, 4 Drawing Sheets

5,551,660

DRUM STICK HOLDER

BACKGROUND

1. Cross-Reference to Related Applications

This invention uses tubes or cylinders of patent application Ser. No. 4,531,443 filed Oct. 9, 1984.

2. Field of Invention

This invention relates to musical equipment accessories, specifically an improvement for a holder for drum sticks or other musical accessories.

3. Description of Prior Art

Original stick holders were made out of a tray. The trays permitted the sticks and beaters to co-mingle. Further, even when the correct pair of sticks are located, they cannot generally be individually grasped but must be removed from the tray and then separated for use. This problem has been partially solved by the percussion stick holder, but this had and still has significant problems. In the prior art of U.S. Pat. No. 4,531,443, Richard P. Gillis, Jr., Jul. 30, 1985, a gripper comprising a spring clamp will weaken greatly with use and so become unable to be held with the clamp in place. Further, spring clamp placement is limited to a narrow range of instrument stands.

Gillis, Jr., discloses holder for percussion sticks (refer to Gillis, Jr. Prior Art, FIG. 2); however;

1. A gripper in spring clamp will weaken greatly with use and so become unable to hold the clamp in place. Spring clamp placement is limited to a narrow range of instrument stands.

2. It is a simple design, lacking needed maneuverability and adaptability.

3. It allows for only a very limited placement on a stand.

a. If holder was to be placed high on the stand, the plate would have to be rotated too far and the sticks would fall out of the tubes.

b. If positioned under a drum, for example, it can only be placed on the lower portion, or the sticks will not be able to be removed.

c. If positioned lower on the stand, there is a good possibility of injury from hitting the sticks with the knees, and also causing unnecessary noise.

d. If positioned on the stand under the snare drum, it is a far reach to the sticks, as the musician must reach all the way under the drum down to where the accessories are attached.

4. The tubes are stationary on the bracket and cannot move independently. The bracket can only move the holders to the left or right, not forwards or backwards.

5. The holders for the sticks are placed too far apart. They cannot be grasped and removed with one hand in one movement, but must be removed individually.

Objects and Advantages of Ken LeDuchowski's Drum Stick Holder

Several objects and advantages of the present invention overcome these disadvantages. The drum stick holder allows the stick holders to maneuver to any desired position. It attaches to virtually any stand, bar, or other equipment. The drum stick holder includes a clamp which firmly attaches apparatus to any desired height on a stand. The clamp can also be used on a stand for more maneuverability. It also includes an extension arm with a coupling to allow easy adjustment in a left or right motion. The drum stick holder has an additional extension arm with coupling which allows for a forwards or backwards motion. Further, additional adjustments at the end of the extension arm provide independent capability for lateral movement of stick holders.

The drum stick holder can be placed so as to be able to remove sticks quickly and accurately in a one-handed movement if desired. Due to the versatility of movement, the drum stick holder can be placed virtually anywhere and the holders positioned so that the drum sticks won't fall out of the holders. This allows a musician to accurately locate the correct accessories and grasp them quickly, maintaining the proper rhythm of the performance. The drum stick holder can be positioned so as not to hinder the movement of the musician. For example, the drum stick holder allows production with durable materials such as aircraft-grade aluminum, aliphatic urethane, or anodized aluminum, wood, and a wide variety of colors.

1. The drum stick holder includes a clamp which firmly attaches to any height on a stand by means of a wing nut which can be quickly and easily removed simply with the fingers. This attachment by means of a wing nut also assists in the resistance of the clamp to weakening and wear. The clamp of the drum stick holder attaches to virtually any stand, bar, rim, or other equipment. A clamp, itself, can be maneuvered for more adjustability.

2. The drum stick holder allows the drum sticks to be maneuvered to any desired position.

3. The drum stick holder includes an extension column arm with a coupling to allow easy adjustment in a left or right motion. It also has an additional extension arm with coupling which allows movement in a forwards or backwards motion. Further adjustments at the end of the extension arm are capable of providing independent movement of the stick holders.

4. The drum stick holder may be placed on virtually any stand, bar, or rim, due to its versatile clamp. The great maneuverability due to the couplings allows the musician to then adjust the stick holders to the desired position without the danger of having the sticks fall out of the holders, or hitting part of the apparatus causing injury or noise.

5. Due to the capability of independent movement of the stick holder cylinders, a musician may accurately and quickly locate the correct accessories. It also allows the musician to grasp the correct accessories in a quick, one-handed movement, thereby maintaining the proper rhythm of the performance.

Further objects and advantages of my invention will become apparent from a consideration of the drawings and ensuing description.

Dimensions, relationships and material are as follows: Coupling 50 is ½ inch thick and is joined to shaft 38, the entire clamp not exceeding 4 inches in length. Shaft 38 could be made ½ inch long, and ¼ to ½ inch thick. The back of or end of shaft and beginning of parallel arms could also be 1 inch long and ¼ to ½ inch thick. Joined to two parallel arms are two semi-circular arms. The parallel arms could be ½ to ¾ inch thick, and ¾ inch in length. The opening of the semicircular arms must be able to fit (expanded and closed) around a 1½ inch to 1¾ inch diameter bar, and close on a drum rim of ¼ inch or less. Coupling 20 is ½ inch thick and 1½ inch in diameter and is attached to a column 56 which is ½ inch thick and 1 inch long, attached to another couling 58 which is ½ inch thick and 1½ inch in diameter. Coupling 24 is ½ inch thick and 1½ inch in diameter and is joined to an extension arm on the outside of coupling 24. The moving coupling must pass in full rotation without any interference or hitting anything in its path. Extension arm is 5½ inches long and ½ inch thick. The crossbar is 2½ inches long and ½ inch thick. The cylinders are 4 to 4½ inches long and ¾ to 1 inch in diameter. Screws extending 8/32 to 1½ inches from cylinders would be most commonly used. Screws which attach couplings are 1½×8/32 inches. The wing nuts are 8/32. The carriage bolt is ¼×1½ inches. Washers are ¼ inches. springs are 8/32 inches. Spacers are ½ inch long with holes of 8/32 inches.

SUMMARY

A drum stick holder assembly of this invention provides having an adjustable fastener which easily removes or effectively fastens apparatus to a stand, bar or rim. A coupling allows for clockwise or counterclockwise adjustments. Another coupling allows for forwards and backwards rotational adjustments. Having one or two cylinders will enable independent rotational adjustments.

DRAWING REFERENCE NUMERALS

Figure 1:
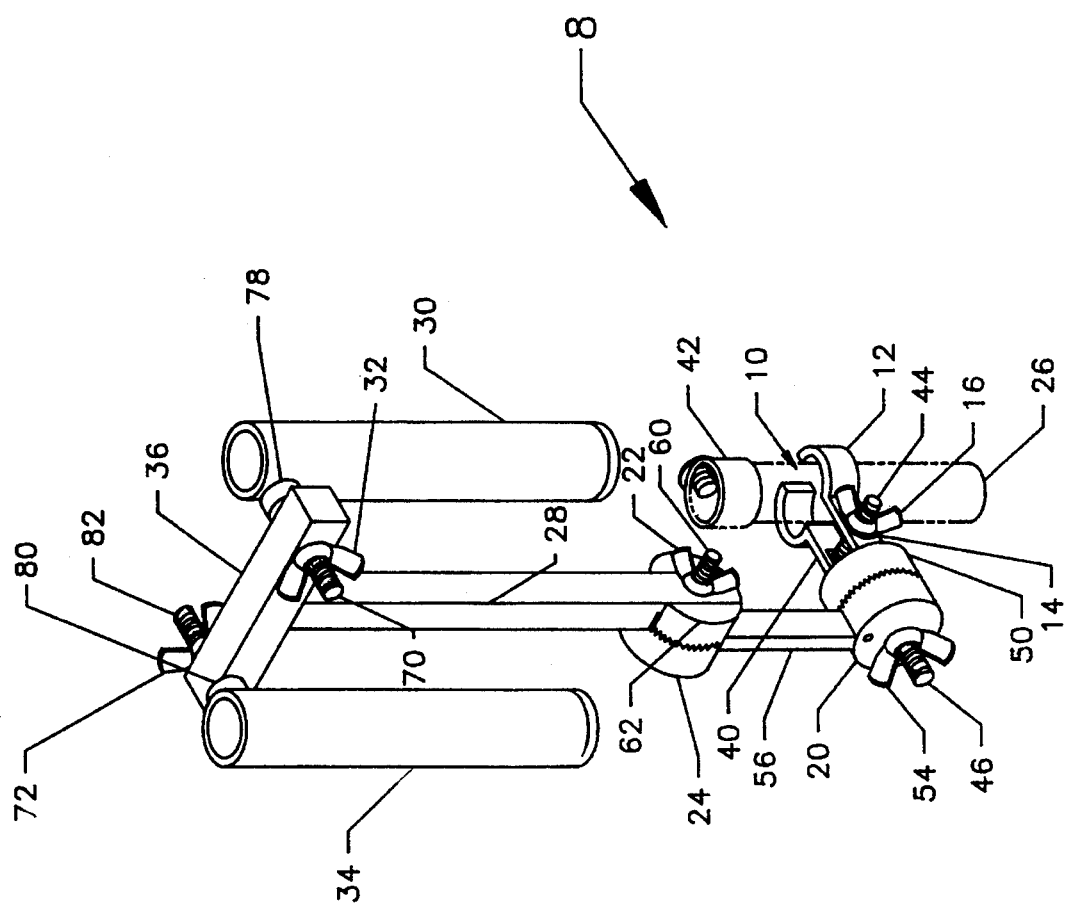
FIG. 1 Shows a general side perspective of the preferred embodiment of a drum stick holder.

Part Name
8 - Clamp
10 - Rim clamp opening
12 - Semi-circular arms
14 - Washer
16 - Wing nut
18 - Square hole
20 - Coupling
22 - Wing nut
24 - Coupling
26 - Stand
28 - Extension arm
30 - Cylinder
32 - Wing nut
34 - Cylinder
36 - Cross bar
38 - Shaft
40 - Parallel arms
42 - Tightener
44 - Carriage bolt
46 - Screw
48 - Spring
50 - Coupling
52 - Hole
54 - Wing nut
56 - Column
58 - Coupling
60 - Screw
62 - Hole
64 - Spring
66 - Open end
68 - Hole
70 - Threaded screw end
72 - Wing nut
74 - Hole
76 - Hole
78 - Spacer
80 - Spacer
82 - Threaded screw end
84 - Hole
86 - Fully rotatable
88 - Rod
90 - Main body
92 - Scarf
94 - Scarf hole

DESCRIPTION OF INVENTION

In FIG. 1, an expandable clamp 8 is quickly and easily mounted to a stand 26, bar, or drum rim. The semi-circular arms 12 are joined to two straight arms 40. A clamp 8 is tightened by a carriage bolt 44 through square hole 18 and round hole 84 (not shown) in parallel arms 40, passing through washer 14 and tightened by a wing nut 16. At the end of the parallel arms 40 is a shaft 38 joined by a coupling 20. A coupling 20 rotates in a left or right direction 86. A coupling 20 is attached to a column 56 which ends in another coupling 24. A coupling 24 is tightened by a wing nut (not shown) 22, allowing an arm 28 to move forwards or backwards. From a coupling 24 extends an extension arm 28, ending in a crossbar 36. On the top of a crossbar 36 to one side of an extension arm 28 is a cylinder 34. A cylinder 34 is open at one end and closed at the other, and tightened to a crossbar 36 by a wing nut (82). A wing nut (82) allows side to side movement of cylinder 34 or full rotation by means of a spacer (80). On the bottom of a crossbar 36 to the other side of an extension arm 28 is another cylinder 30 which is open at one end and closed at the other. A cylinder 30 is tightened to a crossbar 36 by a wing nut 32 and a spacer (not shown) between cylinder 30 and crossbar 36. A wing nut 32 allows a cylinder 30 to move laterally (right to left).

Figure 2:
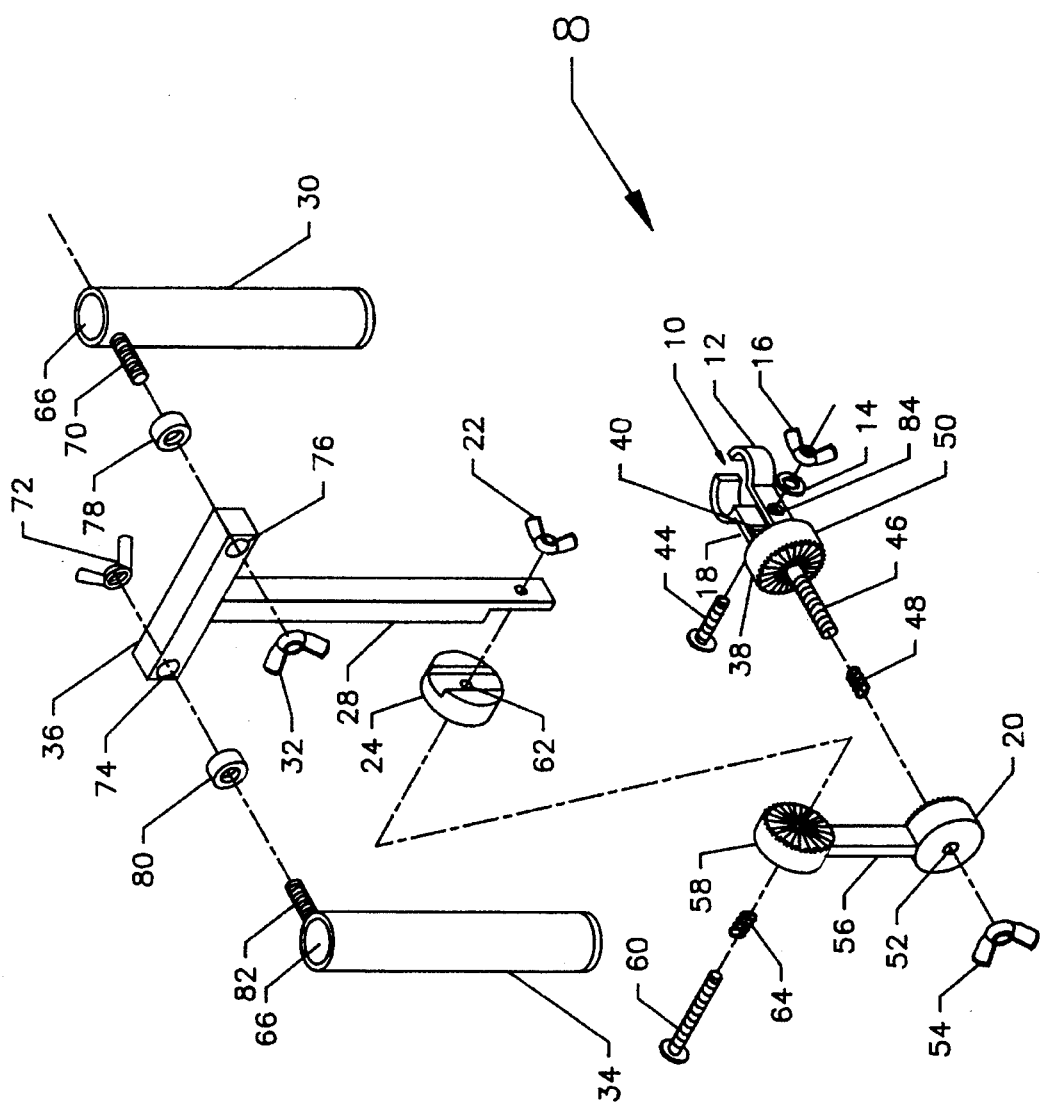
FIG. 2 Shows an exploded assembly drawing showing individual elements comprising a drum stick holder.

In FIG. 2, which shows an exploded view of the preferred embodiment, a mounting clamp 8 has an opening 10 at one end of two semi-circular arms 12. The semi-circular arms 12 are jointed to two straight parallel arms 40. Two straight parallel arms 40 are pierced by a square hole 18 in one and a round hole 84 in the other. A mounting 8 is tightened by means of a carriage bolt 44 locking in a square hole 18 of one straight parallel arm 40 and extending through a round hole 84 in another straight parallel arm 40, and tightened on the outside by means of a washer 14 and a wing nut 16. The two straight parallel arms 40 are attached to a shaft 38 which ends in a coupling 50. A screw 46 is centrally mounted to the inside of a coupling 50 extending outwards. A spring 48 is fitted over a screw 46 and inserted through a circular hole 52 in the center of a matching coupling 20, which is tightened at the opposite end of a coupling 20 by a wing nut 54. A coupling 20 allows an extension arm column 56 to rotate in a full circle and lock in position at any desired point. A spring 48 creates tension between couplings 50/20, making adjustments in tightening the position of a column extension arm 56 easier. A coupling 20 is attached by an extension column arm 56 and joined at the end by another coupling 58. A coupling 58 is tightened to another coupling 24. A screw 60 passes through a circular hole 62 in a coupling 24. A spring 64 is placed over a screw 60 between coupling 24 and coupling 58. Couplings 24 and 58 are tightened at the outside of a coupling 58 by means of a wing nut 22. A coupling 24/58 allows an extension arm 28 attached to a coupling 24 to rotate in a complete circle backwards and forwards. A wing nut 22 allows an extension arm 28 to be locked in any desired position. An extension arm 28 culminates in a horizontal crossbar 36. A cylinder 34 which is closed at one end and open 66 at the other is placed on top of one arm of a crossbar 36. A cylinder 34 is separated from a crossbar 36 with a spacer 80. A screw 82 extends down from a cylinder 34 through the spacer 80 and then through a circular hole 74 in a crossbar 36. A wing nut 72 placed under a crossbar 36 is tightened onto a screw 82 securing a cylinder 34 to a crossbar 36. This tightening mechanism 72/80/82 allows a cylinder 34 to rotate in a full circle either to the right or to the left.

A cylinder 30 which is closed at one end and open 66 at the other attaches underneath a crossbar 36 at its opposite end. A spacer 78 separates a cylinder 30 from a crossbar 36. A screw 70 extends up from a cylinder 30 through a spacer 78 and through a circular hole 76 in a crossbar 36. A wing nut 32 on top a crossbar 36 tightens onto a screw 70, tightening a cylinder 30 to a crossbar 36. A tightening mechanism 70/78/32 allows a cylinder 30 to rotate in a full circle to the left or right. A wing nut 32 allows a cylinder 30 to be tightened in any desired position. A cylinder 34 attached to the top of a crossbar 36 and a cylinder 30 attached underneath a crossbar 36 allows full independent rotation of each cylinder 34/30.

Figure 3:
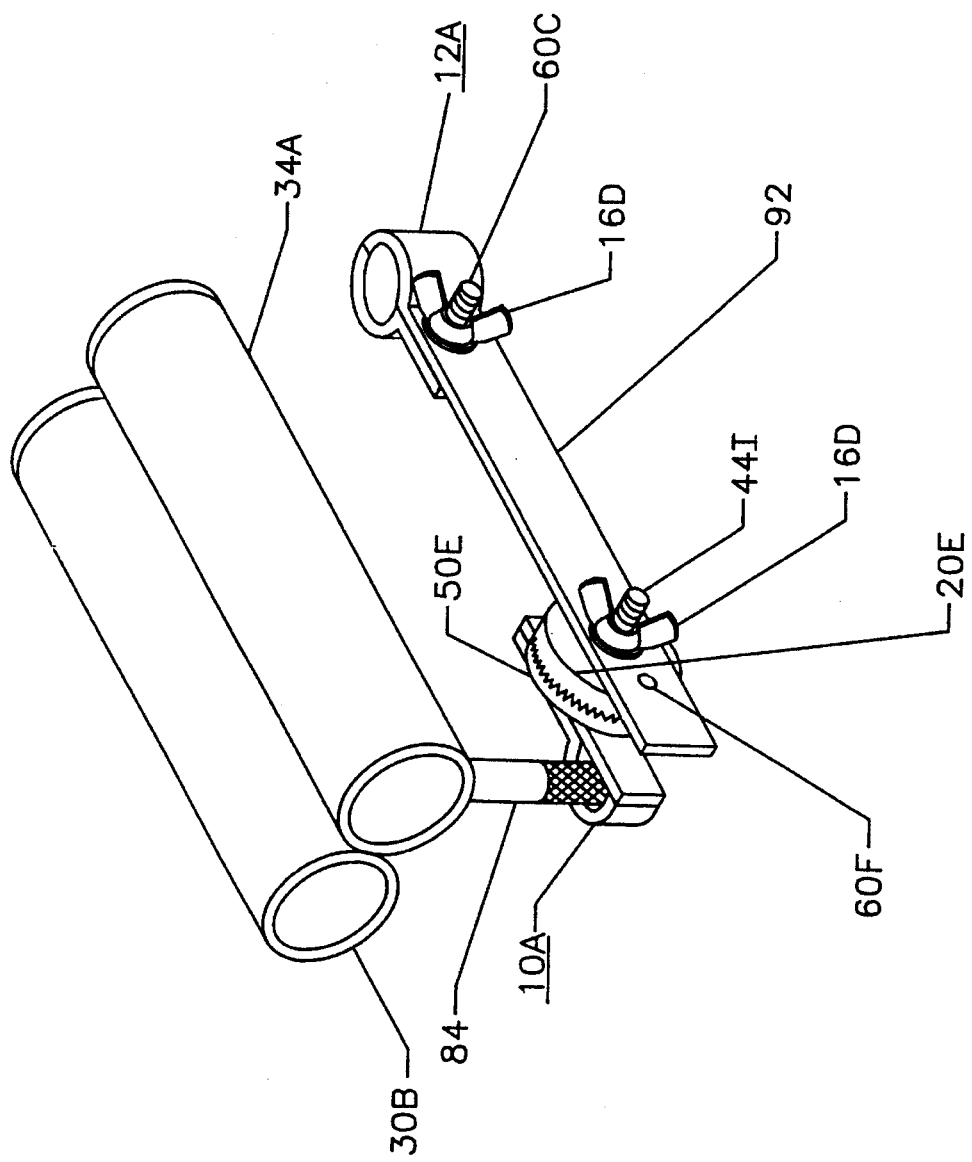
FIG. 3 Shows a top view of an alternate embodiment of a drum stick holder.

FIG. 3 shows a top view of an alternate embodiment.

Figure 4:
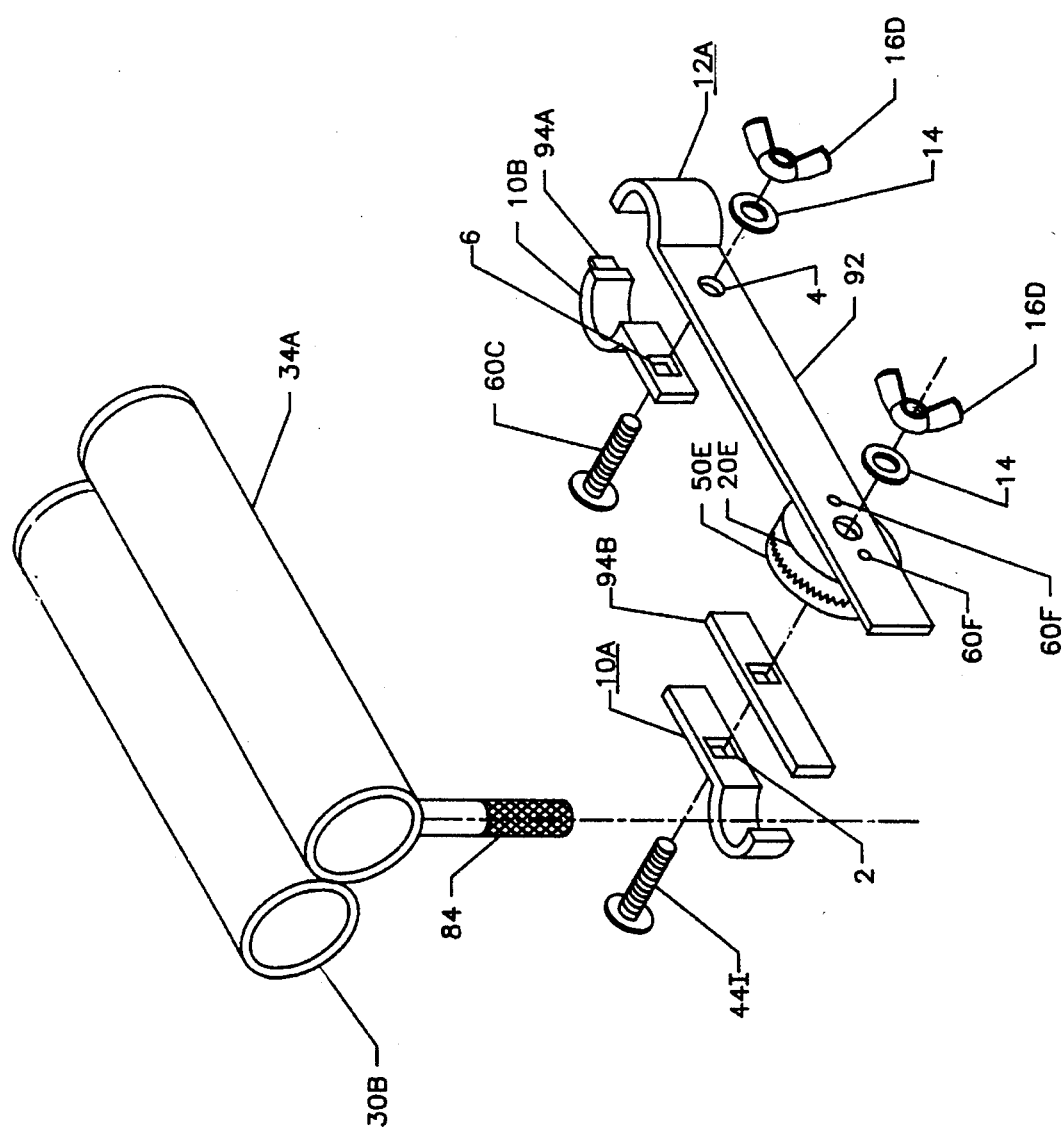
FIG. 4 Shows an exploded side view of an alternate embodiment of a drum stick holder.

FIG. 4 shows an exploded view of an alternate embodiment. A clamp 12A of main body 90 joins together with an attachable expandable clamp 10B and interlocks by means of a screw 60C through holes in the clamp parts 12A, 10B, and tightens with a wing nut 16D. For adjustments, cylinders 34I and 30J joined together by a fully rotational rod 88. Rod 88 is attached outside coupling 20E by means of clamp 10B which fits over rod 88 and attaches to coupling 50E for left to right or full rotation. Carriage bolt 44H then passes through clamp 10B, then through coupling 20E and in through matching coupling 50E, then is tightened by a wing nut 16D. By adjusting couplings 20E and 50E by means of loosening wing nut 16D for clockwise or counterclockwise movement, left to right movement of cylinders is allowed all in one mechanism.

Description of Structure of Drum Stick Holder

The structure of the most preferred embodiment as you can see in FIG. 1 shows a clamp 8 which has an opening 10 at the end of semi-circular arms 12 for access to fit around stands 26. The opening 10 of the clamp 8 clamps to a drum rim or other flat surface which gives a highly-reliable clamping device to almost anything. Going along semi-circular arms 12 are two parallel arms 40; this gives great strength to the opening 10 in clamp 8 for more flexibility. The shaft 38 is attached to the parallel arms 40 for support of the coupling 20 so the shape of the coupling 20 is not bent when in use by the expandable clamp 8 or semi-circular arms 12 being pulled apart. Couplings 20 are matched together for adjustments. Joined to coupling 20 is a rectangular column 56. This column 56 is made for easy grasping by fingers. At the other end of this column 56 is another coupling 24. On one side of matching couplings 24 is a square extension arm 28. This gives the full structure view.

Square extension arm 28 extending outwards gives more precise movement and adjustments. Joined to extension arm 28 is a horizontal cross-bar 36, square in shape. This gives more capability of movement for round cylinders 34/30 which are attached to cross-bar 36 by wing nuts 32/72. Wing nuts 32/72 are screwed on each side of crossbar 36 to hold cylinders 34/30 in place.

Operation of Drum Stick Holder

The operation of the most preferred embodiment (FIGS. 1, 2) starts with the open end 10 of the clamp 8. The open end 10 of the clamp 8 gives access to fit around different sizes of stands and tubular structures by loosening the wing nut 16 on the parallel arms 40 allowing the semi-circular arms 12 to be pulled apart and placed on a stand 26. The drum stick holder includes an extension column arm with a coupling to allow easy adjustment in a left or right motion. It also has an additional extension arm with coupling which allows movement in a forwards or backwards motion. Further adjustments at the end of the extension arm are capable of providing independent movement of the stick holders. By this mechanism 44/14/16, a cut in the open end 10 can clamp 8 onto a drum rim or any flat surface that a clamp can clamp onto. The clamp itself can maneuver on a stand or bar for further adjustments. The carriage bolt has a round head joined by a square head. The square head locks into one of the parallel arms 40 for quicker releases. The washer helps the wingnut to stay in a locked position. At the end of the semi-circular 12/parallel arms 40 is a short shaft 38. This shaft 38 is joined to one half of a coupling 50. The shaft 38 acts as a tension releaser between the clamp 8 and the coupling 50. As the clamp 8 is being expanded, the shaft 38 absorbs the tension and does not interfere with the structure of the coupling 50 or put unnecessary stress on it. The matching coupling 20 is joined by a column 56 and is brought together by a mechanism consisting of a screw 46, spring 48, and a wing nut 54. When the couplings 50/20 are loosened by a wing nut, they are able to move in a clockwise or counterclockwise movement. A screw 46 is affixed in the coupling 50 extending outwards with a spring 48 fitting over a screw 46. The spring 48 acts as a tension spring 48 for easier adjustments between the two couplings 50/20.

The other coupling 20 with hole 52 fits over the screw 46 and at the same time compresses a spring 48 that is tightened by a wing nut 54 on outside of coupling 20 for proper adjustments. This is how the couplings 50/20 work together as one mechanism. A coupling 20 is attached to a column 56—a column 56 is rectangular in shape for easy grasping and adjustment with the thumb and first finger. Adjustments can be made with one hand and loosened with the other. At the end of column 56 is another coupling 58. This coupling 58 is attached to an extension arm 28 of the coupling 24 and works the same way as the other coupling 20/50 by means of screw 60, spring 64, and wing nut 22. This independent screw 60 fits through extension arm coupling hole 62 through a spring 64 through another coupling 58 and is tightened by wing nut 22. The 60/64/22 mechanism in the couplings 24/58 gives a forwards to backwards motion. Extension arm 28 is joined on the outside of extension arm coupling 24. Extension arm 28 extends outwards from a coupling 24 and is attached at the end by a horizontal cross bar 36. This allows for two cylinders 34/30 to be joined on a cross bar 36 to fit in length of extension arm 28 to move as one mechanism. A fastening wing nut 32/72 gives each cylinder 34/30 independent movement of each other. The cylinders 34/30 are offset on a crossbar 36 with one on top and one underneath. A wing nut 72/32 fastens a cylinder 34/30 to crossbar 36 by a screw 82/70 mounted on a cylinder 34/30; then screw 82/80 goes through a hole in a spacer 80/78, then through a crossbar 36 and tightened by a wing nut 72/32. The spacer 78/80 prevents cylinder 34/30 from interfering with or hitting the other wing nut 72/32 when being fully rotated or adjusted.

FIG. 3.4 shows an additional embodiment. FIG. 4 has a clamp which comes fully apart and can clamp to stands. It has a main body, a device for making movements forwards and backwards, left to right adjustments. Two cylinders for holding drum sticks is preferred.

Starting with clamp parts 12A, 10B, by putting scarf 92 of 12A into hole of 94 makes clamp join together. Screw 60C independently goes through hole of clamp 10B. Through hole of clamp's main body 90, tightened by wing nut 16D for expandability, it can conform clamp to fit any stand. Main body 90 has a coupling 50E affixed to main body by screws 60F. A matching coupling 20E, to comply with forwards and backwards motion, is joined by another clamp which attaches to coupling 20E at scarf 92. Scarf 92 is joined to clamp 10B through hole in clamp 10B. Putting rod 88 behind coupling 20E and having clamp 10B fit around rod 88 gives the most for left to right movement. Cylinders 30J/34I are attached to rod 88. Carriage bolt 44H goes through hole of clamp 10B, then through coupling 20E through coupling 50E and tightened on outside of coupling 50E by wing nut 16D. By loosening wing nut 16D on couplings 50E, it gives the coupling 50E,20E forwards and backwards movement and rod 88 capability to move right to left, all in one mechanism.

Conclusions, Ramifications, and Scope of Invention

The reader will see that the Drum Stick Holder of the invention provides a highly reliable, lightweight, yet economical device that can be used by persons of almost any age.

While my above descriptions contain many specifics, these should not be construed as limitations on the scope of the invention, but rather as an exemplification of one preferred embodiment thereof. Many other variations are possible. For example, the drum stick holder allows for interchangeable parts and more adjustments on the extension arm and cross bar. It could also have a double clamping device on each end of the column.

Accordingly, the scope of the invention should be determined not by the embodiment(s) illustrated, but by the appended claims and their legal equivalents.

As many possible embodiments may be made of this invention without departing from the spirit or scope thereof, it is to be understood that all matters herein set forth in the accompanying drawings are to be interpreted as illustrative and not in any limiting sense.

What is claimed is

1. A holder for drumsticks comprising;
   a. a clamp for attaching said holder to a longitudinally elongated stanchion,
   b. a first pivotable arm,
   c. a first releasably clampable pivotable joint fastened between said clamp and said first pivotable arm, said pivotable joint allowing pivotable motion of said first arm in a first plane parallel to the longitudinal axis of said stanchion,
   d. a second pivotable arm,
   e. a second releasably clampable pivotable joint fastened between said first and second pivotable arms, said second pivotable joint allowing pivotable motion of said second second pivotable joint allowing pivotable motion of said second arm in a second plane parallel to said second arm, the respective pivot axes of said first and second pivotable joints being mutually perpendicular,
   f. at least one drumstick retaining means attached to said second pivotable arm for releasably retaining a drumstick on said second pivotable arm, and
   g. a longitudinally elongated cross arm portion disposed transversely across an end portion of said second pivotable arm opposite said second pivotable joint, said cross arm being interposed between said second pivotable arm and at least one drumstick retaining means, the latter being attached to a first longitudinal outer end portion of said cross arm.

2. The drumstick holder of claim 1 wherein said pivot axis of said first pivotable joint is further defined as being perpendicular to said stanchion, with said clamp attached to said stanchion.

3. The drumstick holder of claim 2 wherein said first pivotable joint is further defined as comprising in combination a first coupling member attached to said longitudinally elongated clamp, said first arm coupling member having a toothed face transversely disposed to said pivot axis of said first pivotable joint, an elongated pivot member protruding outwards from said toothed face along a line defining the pivot axis of said joint, a second coupling member having a toothed face pivotable mounted on said pivot member and transversely with respect to said pivot member, and means for releasably holding said toothed faces of said first and second toothed members into locking irrotational contact.

4. The holder of claim 3 wherein said elongated pivot member is further defined as penetrating said second toothed member.

5. The holder of claim 4 wherein said elongated member is further defined as being threaded.

6. The holder of claim 5 wherein said means for releasably holding said toothed faces of said first and second toothed members into locking irrotational contact is further defined as being a threaded member tightenable on said threaded pivot member to urge said toothed faces into locking contact.

7. The drumstick holder of claim 1 wherein said drumstick retaining means is further defined as being pivotably fastened to said cross arm.

8. The drumstick holder of claim 7 further including a second drumstick retaining means pivotably attached to a second longitudinal end portion of said cross arm.

9. The drumstick holder of claim 1 wherein said drumstick retainer means is further defined as being an elongated tubular member having a first, open upper end for receiving a drumstick and a second closed lower end for limiting motion of a drumstick into said tubular member.

10. The drumstick holder of claim 9 wherein said tubular member is further defined as being pivotably fastened to said second pivotable arm.

11. The drumstick holder of claim 10 further including a second tubular member fastened to said second pivotable arm.

12. The drumstick holder of claim 11 wherein said second tubular member is further defined as being pivotably fastened to said second pivotable arm, independent of said tubular member.

* * * * *